United States Patent
Quade et al.

(10) Patent No.: US 11,852,471 B2
(45) Date of Patent: Dec. 26, 2023

(54) REAR DERAILLEUR AND CASSETTE PRE-CHECKING DEVICE

(71) Applicants: Jason C. Quade, Bend, OR (US); Jeff Crombie, Edinburgh (GB)

(72) Inventors: Jason C. Quade, Bend, OR (US); Jeff Crombie, Edinburgh (GB)

(73) Assignee: ABBEY BIKE TOOLS, Bend, OR (US)

( * ) Notice: Subject to any disclaimer, the term of this patent is extended or adjusted under 35 U.S.C. 154(b) by 238 days.

(21) Appl. No.: 17/535,428

(22) Filed: Nov. 24, 2021

(65) Prior Publication Data

US 2023/0160679 A1 May 25, 2023

(51) Int. Cl.
*G01B 5/25* (2006.01)
*B62M 9/128* (2010.01)

(52) U.S. Cl.
CPC .............. *G01B 5/25* (2013.01); *B62M 9/128* (2013.01)

(58) Field of Classification Search
CPC . G01B 5/25; G01B 5/30; B62M 9/128; B25B 27/0071
See application file for complete search history.

(56) References Cited

U.S. PATENT DOCUMENTS

| | | | |
|---|---|---|---|
| 3,925,873 A | 12/1975 | Mecum | |
| 4,286,953 A * | 9/1981 | Shimano | B62M 9/1244 474/80 |
| 4,858,266 A | 8/1989 | Engstrom | |
| 5,346,434 A * | 9/1994 | Hsu | B62M 9/127 474/82 |
| 6,003,236 A * | 12/1999 | Hoeft | B62M 9/00 33/203 |
| 7,467,477 B1 * | 12/2008 | Flemming | B62M 9/125 33/533 |
| 10,703,441 B2 * | 7/2020 | Dos Santos | B62M 1/36 |

(Continued)

FOREIGN PATENT DOCUMENTS

| | | | | |
|---|---|---|---|---|
| EP | 20033 A | * | 12/1980 | ......... B62M 9/1244 |
| GB | 2560296 A | * | 9/2018 | ......... B25B 27/0071 |

OTHER PUBLICATIONS

"Otto Tuning System—10 & 11 Speed Cassette", Otto Design Works.com [online], [retrieved on Nov. 24, 2021]. Retrieved from <url "http://web.archive.org/web/20161231180203/http://ottodesignworks.com/shop/otto-tuning-system-10-11-speed-cassette">, 2 pages.

(Continued)

*Primary Examiner* — Yaritza Guadalupe-McCall
(74) *Attorney, Agent, or Firm* — Leber IP Law; Celia H. Leber

(57) ABSTRACT

A derailleur hanger alignment pre-checking device, for use on a bicycle having a cassette comprising multiple sprockets and a rear derailleur having a derailleur cage, includes an elongated body having a longitudinal axis and an elongated planar surface disposed substantially parallel to the longitudinal axis, and including a handle portion and a hanger portion. The hanger portion includes a slot cavity having an arcuate rear wall, the slot cavity being configured to receive a portion of a sprocket of the cassette. The slot cavity and planar surface are configured so that when a sprocket is received in the slot cavity the planar surface will be positioned facing a planar surface of the derailleur cage.

11 Claims, 7 Drawing Sheets

(56) References Cited

U.S. PATENT DOCUMENTS

| | | | | |
|---|---|---|---|---|
| 10,900,547 B2* | 1/2021 | Braedt | ............... | F16H 9/24 |
| 11,572,134 B2* | 2/2023 | Braedt | ............... | B62M 9/1242 |
| 2003/0083163 A1* | 5/2003 | Nanko | ............... | B62M 9/135 |
| | | | | 474/82 |
| 2014/0358298 A1 | 12/2014 | Hall et al. | | |
| 2017/0217539 A1 | 8/2017 | Braedt et al. | | |
| 2023/0160679 A1* | 5/2023 | Quade | ............... | B62M 9/128 |
| | | | | 33/533 |

OTHER PUBLICATIONS

Staff, Brian; "Otto Design Works offer derailleur tuning app for consumers, and maybe, shops", Bicycle Retailer [online], published Oct. 1, 2015 [retrieved on Nov. 24, 2021]. Retrieved from <url "https://www.bicycleretailer.com/product-tech/2015/09/30/otto-design-works-offers-derailleur-tuning-app#.YKa4nqhKhaQ">, 9 pages.
"Otto Tuning System Product Training Guide 2016", Otto Design Works.com [online], posted Aug. 2016 [retrieved on Nov. 24, 2021]. Retrieved from <url "https://ottodesignworks.com/sites/default/files/OTS_ProductKnowledge_NoVideos_WebVersion_Aug2016.pdf">, 20 pages.
International Patent Application No. PCT/US2022/077596, Written Opinion dated Jan. 9, 2023, 5 pages.
International Patent Application No. PCT/US2022/077596, International Search Report dated Jan. 9, 2023, 3 pages.

\* cited by examiner

REAR DERAILLEUR AND CASSETTE PRE-CHECKING DEVICE

BACKGROUND

When a bicycle user encounters problems shifting gears, it can be difficult for the user to easily diagnose the nature of the problem. The culprit could, for example, be incorrect cable tension or other cable-related issues, issues with lubrication and/or cleanliness of the drive train, or a bent derailleur hanger, mis-aligned derailleur or bent cog in the rear cassette. If the derailleur hanger, derailleur, or cog is bent, many users will need to have the issue addressed by a skilled repair person at a bike shop, and in some cases the damaged part must be replaced. However, what seems to be a problem with rear derailleur alignment or the rear cassette may actually be something that could easily be addressed by the user, such as adjusting cable tension.

SUMMARY

The present disclosure provides a device that allows a user (for example a bicycle owner or repair person) to easily pre-check whether a derailleur hanger is bent. The device can also allow the user to assess the alignment of the derailleur itself and the condition of the cogs in the rear cassette. Advantageously, use of the device does not require any disassembly of the drivetrain, for example removal of the derailleur. Instead, the user can apply the device to the bicycle and visually check alignment in a matter of moments without the need for any tools other than the device itself.

In one aspect, the invention features a rear derailleur hanger alignment and cassette pre-checking device, for use on a bicycle having a cassette comprising multiple sprockets and a rear derailleur comprising a derailleur cage. The device comprises an elongated body having a longitudinal axis and an elongated planar surface disposed substantially parallel to the longitudinal axis and including a handle portion and a hanger portion. The hanger portion includes a slot cavity having an arcuate rear wall, the slot cavity being configured to receive a portion of a sprocket of the cassette. The slot cavity and planar surface are configured so that when a sprocket is received in the slot cavity the planar surface will be positioned facing a planar surface of the derailleur cage.

Some implementations include one or more of the following features. The slot cavity may have an arcuate rear wall. The slot cavity may have tapered side walls. The hanger portion and handle portion may be integrally formed, e.g., as a single injection molded part. The hanger portion may include a stiffening rib, e.g., to maintain the planarity of the planar surface of the body. The arcuate rear wall has an apex A and the depth of the cavity at apex A may be from about 0.6 to 0.8 inch. The body is formed of a material that is sufficiently stiff to resist bending during use of the device. The body has a length that may be selected so that the body extends approximately the same length as the derailleur cage when the device is positioned on the cassette. The arcuate rear wall may have a radius of curvature R of from about 2.5 to about 3.0 inches.

In another aspect, the invention features a method of pre-checking a rear derailleur, rear derailleur hanger and rear cassette, the method comprising: (a) positioning, on a sprocket of the rear cassette, a device comprising an elongated body having a longitudinal axis and an elongated planar surface disposed substantially parallel to the longitudinal axis, and including a handle portion and a hanger portion, the hanger portion including a slot cavity having an arcuate rear wall, the slot cavity being configured to receive a portion of a sprocket of the cassette. A portion of the sprocket is received in the slot cavity and the planar surface is be positioned facing a planar surface of the derailleur cage, and the method further includes observing visually whether the planar surface of the elongated body is parallel to or angled relative to the planar surface of the derailleur cage.

In some implementations of the method the positioning step comprises placing the device on the next-to-largest sprocket of the cassette.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DETAILED DESCRIPTION

Figure 1:
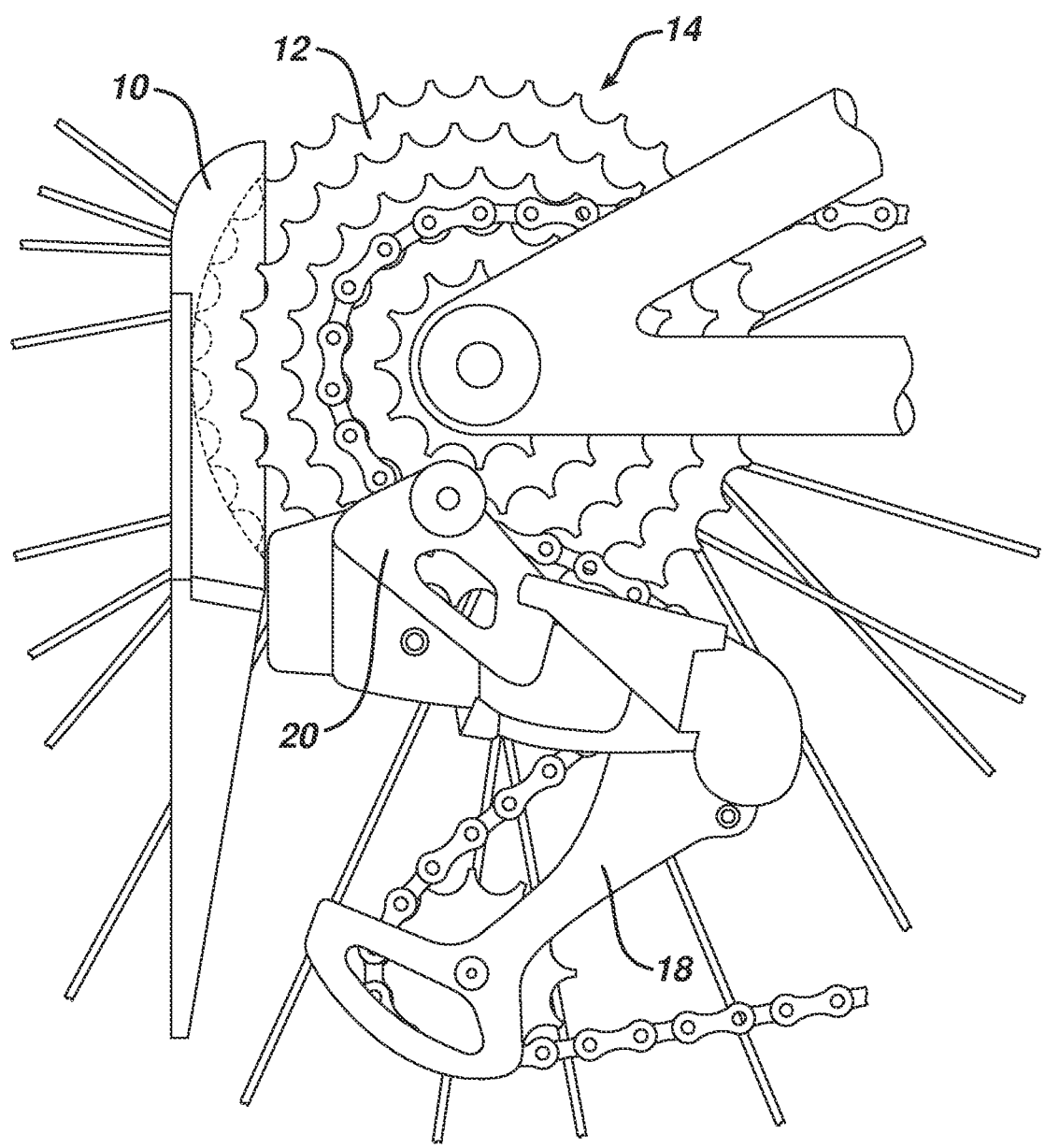
FIG. 1 is a diagrammatic view of a derailleur hanger alignment pre-checking device according to one implementation in use on a bicycle, taken facing the cassette of the bicycle.
Figure 2:
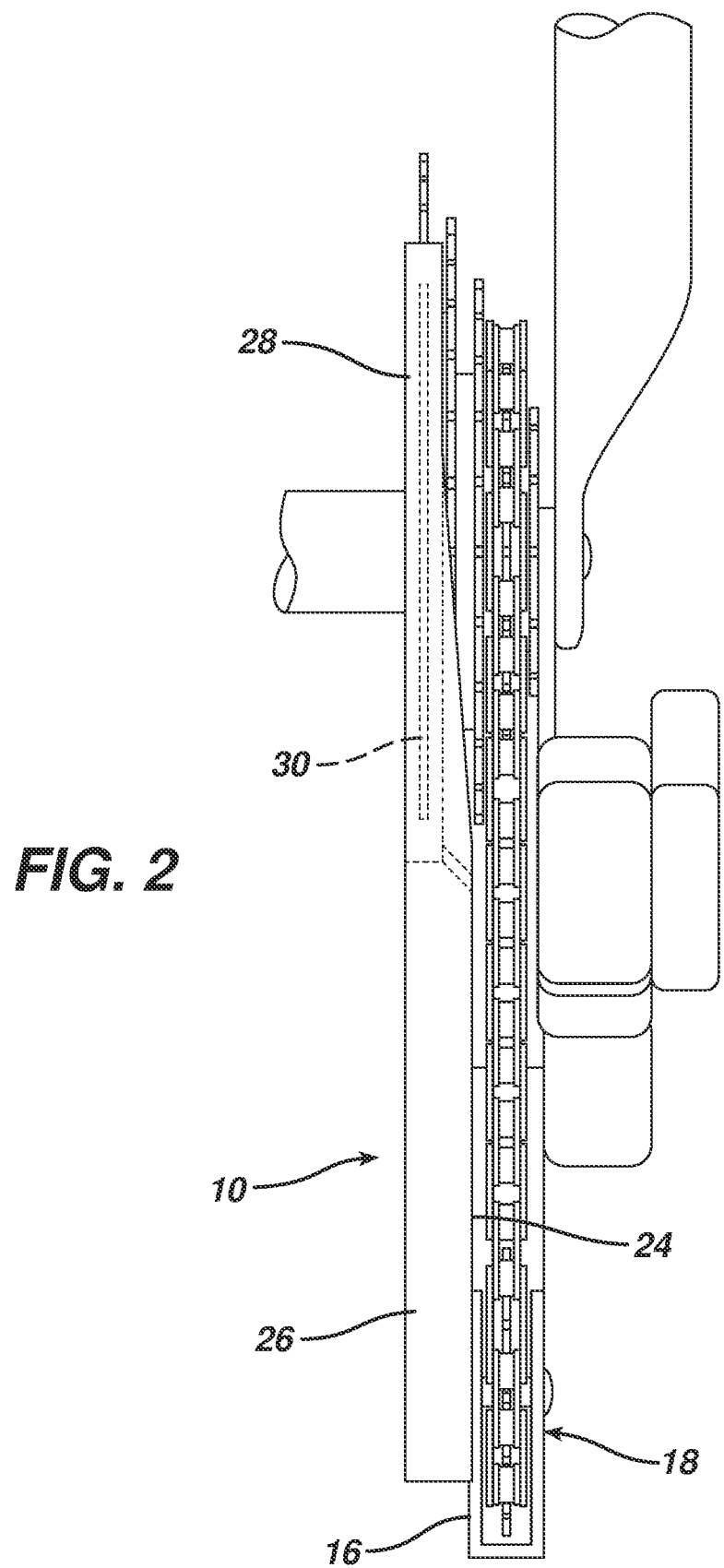
FIG. 2 is a diagrammatic view of the device in use, taken from behind the bicycle as a user would view the device during visual assessment.

The rear derailleur and cassette pre-checking device 10 described herein is used to determine whether something involving the rear derailleur/rear cassette (a bent derailleur hanger, damaged derailleur or bent cog) is the cause of bicycle shifting issues. The device 10 is manually placed by a user on a sprocket (cog) 12 of the cassette 14 of the bicycle, as shown in FIGS. 1 and 2. Its position relative to an adjacent surface 16 of the rear derailleur cage 18 is observed visually by the user, from the vantage point shown in FIG. 2 (behind the rear wheel of the bicycle). If the long axis of the device 10 does not appear to be generally parallel to the adjacent surface 16 of the rear derailleur cage 18, this will likely be due to the derailleur hanger 20 being bent. Thus, the device 10 provides an easy to perform and rapid diagnostic pre-check that can aid the user in decision-making regarding next steps in addressing shifting issues. The device requires only positioning and visual assessment by a user; it does not include any sensors or electronics, and thus is inexpensive, easy to use, has a long product life, and does not require any power supply.

Figure 3:
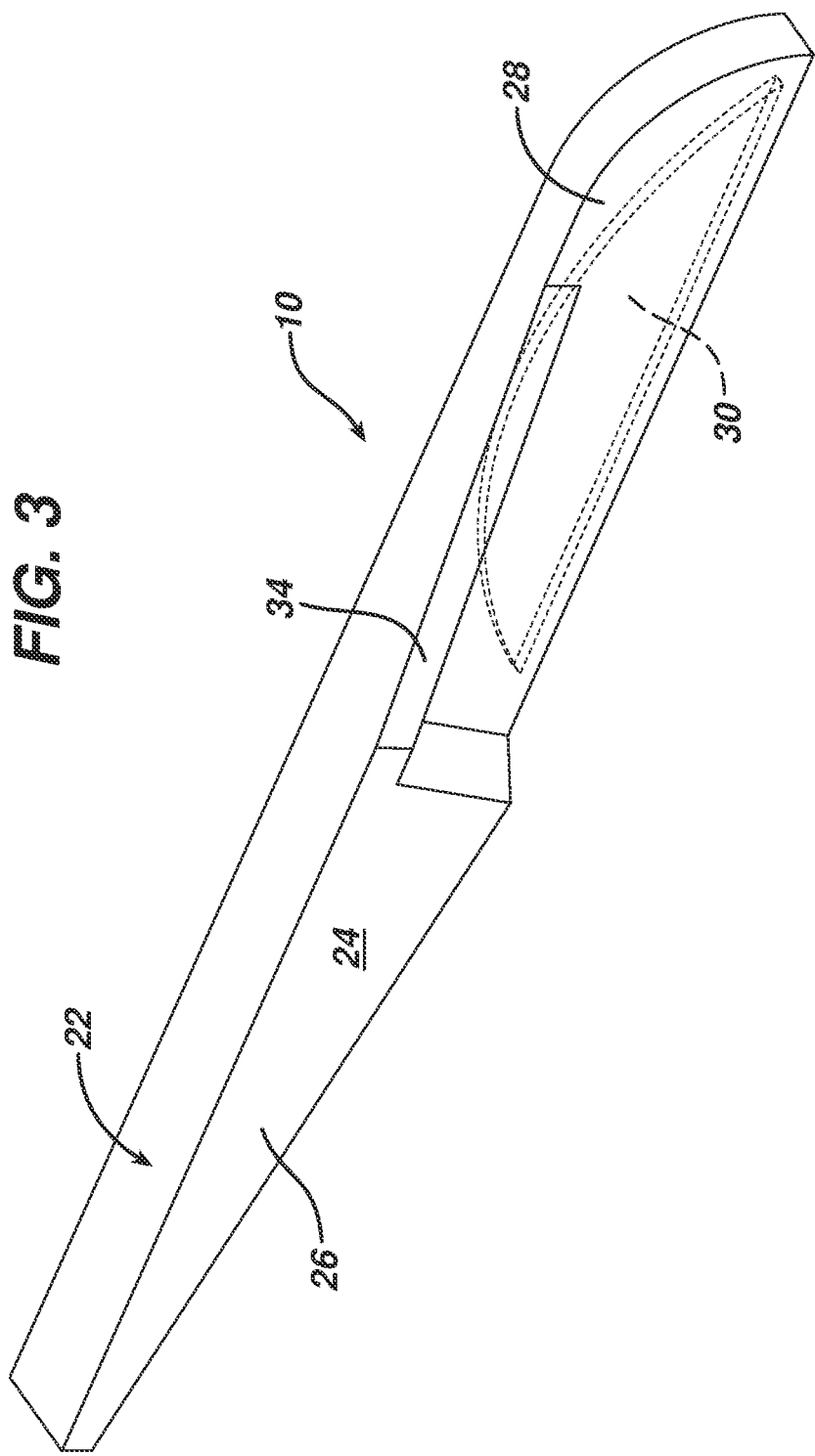
FIG. 3 is a perspective view of the device.

Referring to FIG. 3, the derailleur hanger alignment pre-checking device 10 includes a body 22 which may be, for example, formed of a molded plastic material. It is generally preferred that the body be made of an injection moldable thermoplastic material. Examples of suitable materials include polylactic acid (PLA) and polyethylene terephthalate glycol (PETG). In some implementations, the plastic will have a hardness of at least 60 Shore D, in some cases at least 75 Shore D. It is important that the material be sufficiently hard so that the device does not flex or bend along its length during use and does not change its shape over time.

The body 22 is generally rectangular in cross-section (taken perpendicular to its length) and is preferably a single, integral part as shown. The body 22 is of a length L (FIG. 4) sufficient to allow a user to easily grasp and position the device. Preferably, the length is selected so that the body extends approximately the same length as the rear derailleur cage 18 when the cage is in the position shown in FIG. 2, for example, within plus or minus an inch or in some cases plus or minus 0.5 inch of the derailleur cage length. This allows the user to easily visually determine whether the straight, planar surface 24 of the device is parallel to the adjacent surface of the cage 11, as will be discussed below. Length L may be, for example, from about 7.5 inches to about 10 inches, e.g., from about 8 inches to about 9 inches.

Figure 4:
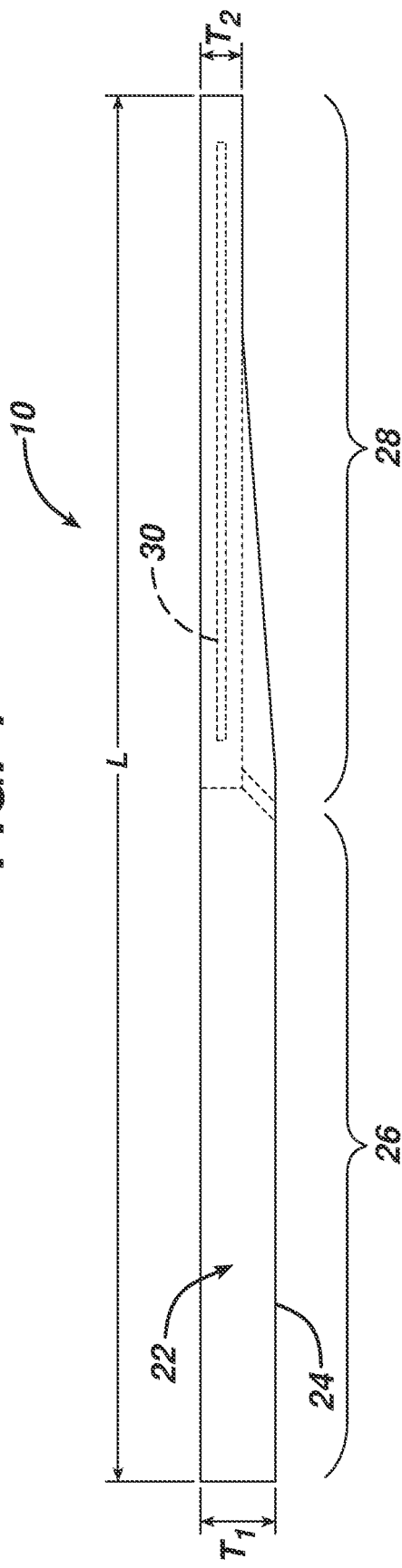
FIG. 4 is a top plan view of the device.

Referring to FIG. 4, the body 22 includes a handle portion 26 and a hanger portion 28. The handle portion 26 is configured to be grasped by the user. The handle portion is also the portion of the device that is used, once the device is positioned, to visually inspect the position of the surface 24 (parallel or not parallel) relative to the adjacent surface 16 of cage 18. The handle portion is generally solid plastic but could be hollow or partially hollow as long as a planar surface 24 is provided and positioned to face surface 16 of cage 18 and to be parallel thereto when the rear derailleur is properly aligned. The thickness $T_1$ of the handle portion 26 is selected so that the surfaces 24 and 16 will be relatively close but not touching when they are parallel. $T_1$ may be, for example, from about 0.45 to 0.50 inch. The gap between parallel surfaces 24 and 16 is selected to be sufficient to allow the user to visually assess whether the surfaces are parallel or not.

Figure 5:
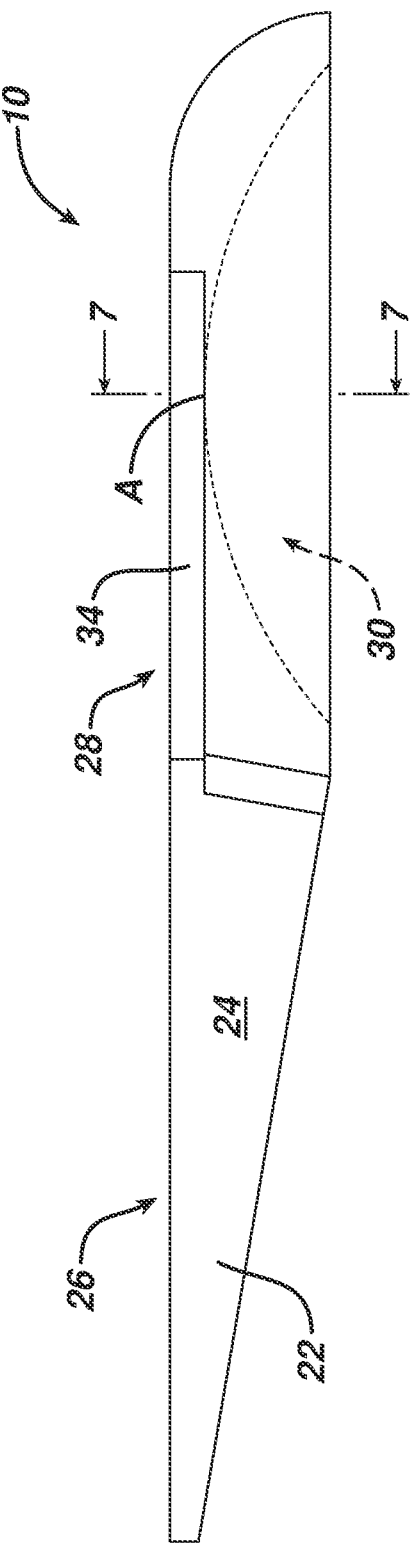
FIG. 5 is a side plan view of the device.

The handle portion 26 has a generally triangular shape when viewed from the side (as in FIG. 5) to allow some clearance between the handle portion and rear derailleur in some positions of the device on the cassette.

Figure 6:
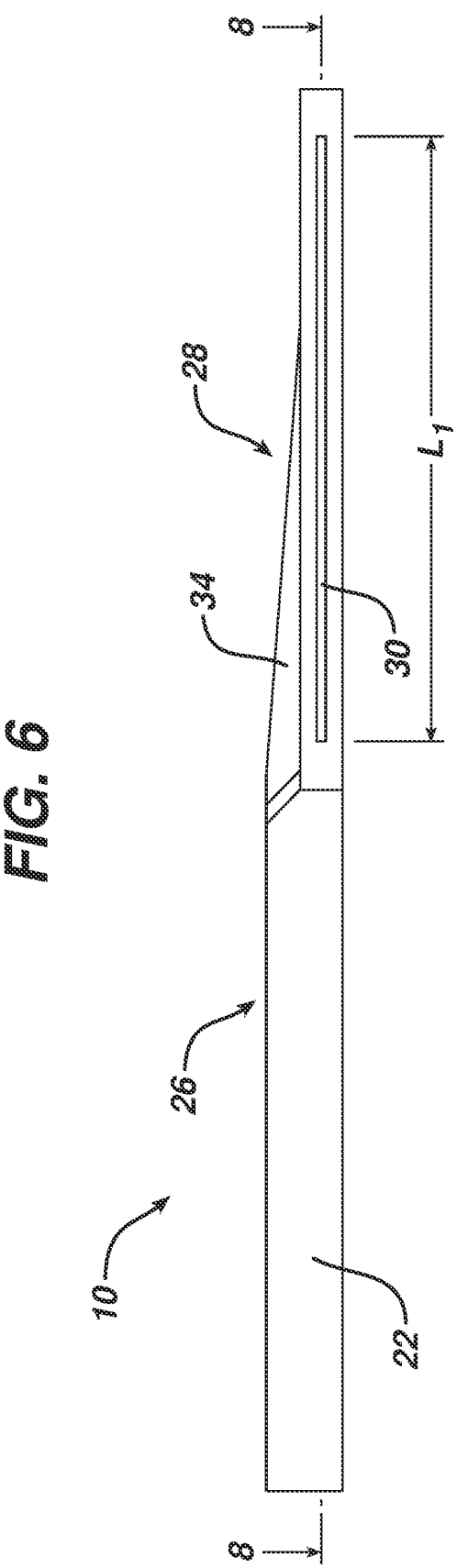
FIG. 6 is a bottom plan view of the device.
Figure 7:
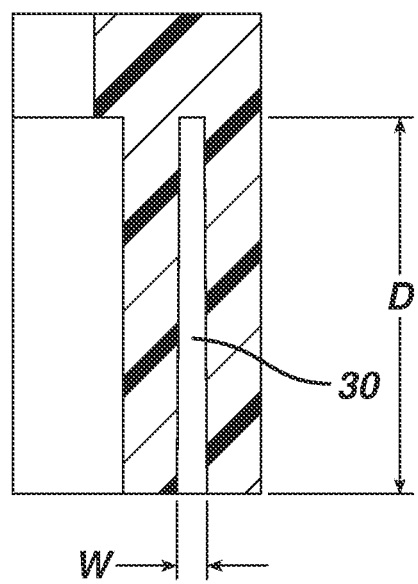
FIG. 7 is a cross-sectional view of the device taken along line 7-7 in FIG. 5.
Figure 8:
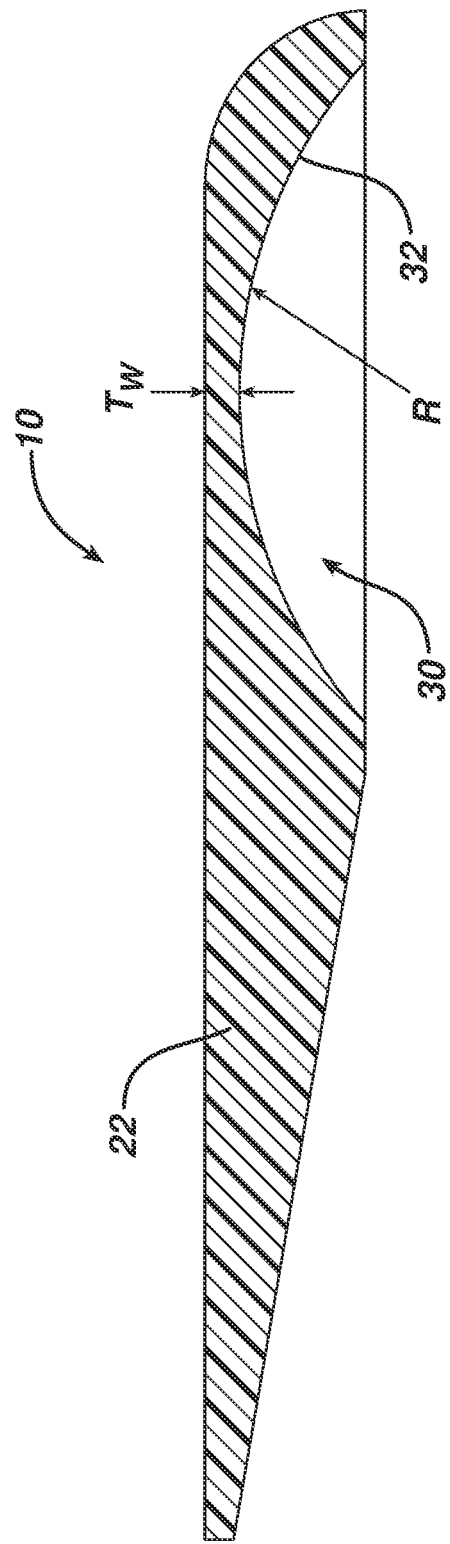
FIG. 8 is a cross-sectional view of the device taken along line 8-8 in FIG. 6.

The hanger portion 28 is configured to be positioned on and hang the device from the sprocket 12. Thus, hanger portion includes a sprocket-receiving slot cavity 30, best seen in FIGS. 6-8. This cavity is configured to correspond in shape to a portion of the sprocket 12, and thus is very narrow and rectangular in cross-section when viewed from the front (FIG. 6) or in the cross-section shown in FIG. 7, but arcuate when viewed in cross-section from the side (FIG. 8) corresponding to the curvature of the sprocket. The width W of the slot cavity 30 (FIG. 7) is very close to the thickness of the sprocket, and thus may be, for example, from about 0.05 to 0.07 inch, e.g., from about 0.057 to 0.062 inch. The cavity is preferably tapered (has tapered side walls) to help retain the tool on the sprocket, as can be seen in FIG. 7. Referring to FIG. 8, the curved rear wall 32 of cavity 30 may have a radius of curvature R of from about 2.5 to about 3.0 inches. The depth D (FIG. 7) of the cavity 30 at its apex A (FIG. 5) is sufficient to hold the device firmly on the sprocket, and may be, for example, from about 0.6 to 0.8 inch, e.g., from about 0.65 to 0.75 inch. The length L1 of the opening of the slot cavity 30 (FIG. 6) is selected to allow a portion of the cog corresponding to the depth of the cavity to be received in the slot opening of the cavity, and thus may be, for example, from about 3.5 to 4.0 inches, e.g., from about 3.65 to 3.85 inches.

The overall length of the hanger portion is selected to be slightly longer than the length L of the opening of the slot cavity. The thickness $T_2$ (FIG. 4) of the hanger portion is selected to allow the hanger portion to fit between adjacent sprockets of the cassette.

At the apex A (FIG. 5) of the cavity the wall thickness $T_w$ (FIG. 8) of the hanger portion is relatively low (e.g., from about 0.175 to 0.225 inch). This, in combination with the low thickness T2 required for insertion between the sprockets, can impart an undesirable degree of flexibility to the hanger portion. The hanger portion needs to be sufficiently stiff so that the wall 24 of the device will remain straight and planar over its length in order to provide an accurate reference plane. To accomplish this, the inner walls of the slot cavity 30 need to remain parallel to each other. Thus, in order to provide the hanger portion with adequate stiffness a stiffening rib 34 is provided, best seen in FIGS. 3 and 5. Stiffening rib 34 extends from the proximal end of the handle portion to beyond the apex A, with the rib tapering in width so as not to impede insertion of the device between the sprockets.

In use, the user positions the device on a sprocket 12 of the cassette 14 by inserting the teeth of the sprocket into the slot cavity of the device. Generally, the next to largest sprocket is used, as shown in FIG. 1, to provide adequate clearance between the handle portion of the device and the derailleur cage 18. The user then stands behind the bicycle and views the device from the position shown in FIG. 2. If the surface 24 of the device appears to be generally parallel to the adjacent surface 16 of the cage, as shown in FIG. 2, the user will know that the shifting problem is not caused by an alignment issue having to do with the sprockets of the cassette, the derailleur, or the derailleur hanger, and can focus his or her efforts on addressing other possible issues such as cable tension or chain wear or lubrication. If, however, the surface 16 of the cage is angled relative to the surface 24 of the device the user will know that it will be necessary to assess the alignment of the rear derailleur, its hanger, and the cassette cogs, which may require the intervention of a professional bicycle mechanic.

Other Embodiments

A number of embodiments have been described. Nevertheless, it will be understood that various modifications may be made without departing from the spirit and scope of the disclosure.

For example, the dimensions provided above are by way of example, and can be scaled and/or varied to accommodate bicycles having differently sized components.

Accordingly, other embodiments are within the scope of the following claims.

What is claimed is:

1. A rear derailleur and cassette pre-checking device, for use on a bicycle having a cassette comprising multiple sprockets and a rear derailleur comprising a derailleur cage, the device comprising:
   an elongated body having a longitudinal axis and an elongated planar surface disposed substantially parallel to the longitudinal axis, and including a handle portion and a hanger portion,
   the hanger portion including a slot cavity, the slot cavity being configured to receive a portion of a sprocket of the cassette, wherein the slot cavity and planar surface are configured so that when a sprocket is received in the slot cavity the planar surface will be positioned facing a planar surface of the derailleur cage.

2. The device of claim 1 wherein the slot cavity has an arcuate rear wall.

3. The device of claim 2 wherein the rear wall has an apex A and the depth of the cavity at apex A is from about 0.6 to 0.8 inch.

4. The device of claim 2 wherein the body is formed of a material that is sufficiently stiff to resist bending during use of the device.

5. The device of claim 2 wherein the arcuate rear wall has a radius of curvature R of from about 2.5 to about 3.0 inches.

6. The device of claim 1 wherein the slot cavity has tapered side walls.

7. The device of claim 1 wherein the hanger portion and handle portion are integrally formed.

8. The device of claim 1 wherein the hanger portion includes a stiffening rib.

9. The device of claim 1 wherein the body has a length that is selected so that the body extends approximately the same length as the derailleur cage when the device is positioned on the cassette.

10. A method of pre-checking a rear derailleur, rear derailleur hanger and rear cassette, the method comprising:

positioning, on a sprocket of the rear cassette, a device comprising:

an elongated body having a longitudinal axis and an elongated planar surface disposed substantially parallel to the longitudinal axis, and including a handle portion and a hanger portion, the hanger portion including a slot cavity having an arcuate rear wall, the slot cavity being configured to receive a portion of a sprocket of the cassette, wherein a portion of the sprocket is received in the slot cavity and the planar surface is be positioned facing a planar surface of the derailleur cage; and observing visually whether the planar surface of the elongated body is parallel to or angled relative to the planar surface of the derailleur cage.

11. The method of claim 10 wherein the positioning step comprises placing the device on the next-to-largest sprocket of the cassette.

* * * * *